(12) United States Patent
Mori

(10) Patent No.: US 8,277,321 B2
(45) Date of Patent: Oct. 2, 2012

(54) GAME DEVICE, CONTROL METHOD FOR GAME DEVICE, PROGRAM, AND INFORMATION STORAGE MEDIUM

(75) Inventor: Hironobu Mori, Osaka (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 151 days.

(21) Appl. No.: 12/740,733

(22) PCT Filed: Sep. 19, 2008

(86) PCT No.: PCT/JP2008/066967
§ 371 (c)(1),
(2), (4) Date: Apr. 30, 2010

(87) PCT Pub. No.: WO2009/057394
PCT Pub. Date: May 7, 2009

(65) Prior Publication Data
US 2010/0240428 A1 Sep. 23, 2010

(30) Foreign Application Priority Data
Nov. 2, 2007 (JP) ................................. 2007-286796

(51) Int. Cl.
*A63F 9/24* (2006.01)
(52) U.S. Cl. ........................................................ 463/42
(58) Field of Classification Search ...................... 463/42
See application file for complete search history.

(56) References Cited

U.S. PATENT DOCUMENTS

| 2003/0040349 A1* | 2/2003 | Imaeda et al. ..................... 463/3 |
| 2005/0255900 A1 | 11/2005 | Takahashi et al. |
| 2007/0265043 A1* | 11/2007 | Wang et al. ....................... 463/2 |
| 2009/0042647 A1* | 2/2009 | Muller ............................. 463/31 |

FOREIGN PATENT DOCUMENTS
CN 1457264 A 11/2003
(Continued)

OTHER PUBLICATIONS

European Search Report corresponding to European Patent Application No. 08845719.7, dated Nov. 24, 2011.
(Continued)

*Primary Examiner* — Omkar Deodhar
(74) *Attorney, Agent, or Firm* — Sughrue Mion, PLLC

(57) ABSTRACT

To provide a game device which can allow a user to feel that an operation subject character loses its balance in a case where the operation subject character hits a moving object in such a state where the operation subject player character is located at a position comparatively far from the moving object in a sport game in which the operation subject character hits the moving object according to a predetermined operation by the user. Determination means (92a) determines whether or not the moving object is positioned in a decision area which is set based on a position of the operation subject character in a case where the predetermined operation is performed. Operation-subject-character control means (92b) causes the operation subject character to hit the moving object in a case where it is determined that the moving object is positioned in the decision area. Decision area control means (92c) controls a size of the decision area after the moving object is hit, based on a position of the moving object at a reference time based on at least one of a time at which the predetermined operation is performed and a time at which the operation subject character hits the moving object.

7 Claims, 8 Drawing Sheets

| FOREIGN PATENT DOCUMENTS | | |
|---|---|---|
| EP | 0778547 A1 | 6/1997 |
| JP | 2003071134 A | 3/2003 |
| JP | 2003-205171 A | 7/2003 |
| JP | 2004113376 A | 4/2004 |
| JP | 2005-349174 A | 12/2005 |
| JP | 2005-349175 A | 12/2005 |
| JP | 2007-244525 A | 9/2007 |

OTHER PUBLICATIONS

"Power Smash 3", 'Gekkan Arcadia ARCADIA 9 Gatsugo', Enterbrain, Inc., Sep. 1, 2006, pp. 114-115, vol. 7, No. 9.

Chinese Patent Application No. 200880112968.6, dated May 3, 2012.

* cited by examiner

FIG.6

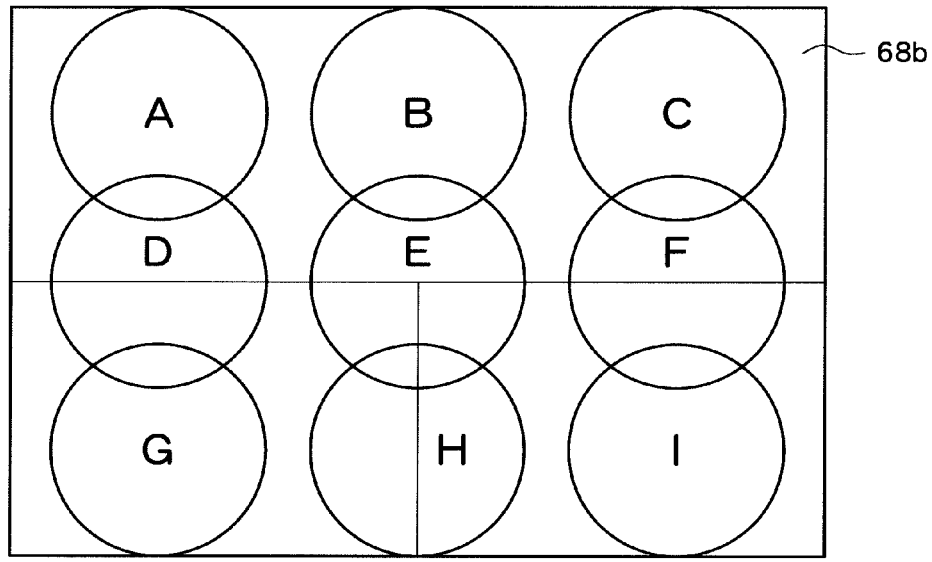

FIG.7

| TARGET AREA | OPERATION CONTENTS OF CROSS-SHAPED BUTTON |
|---|---|
| A | DEPRESS UP INSTRUCTING SECTION AND LEFT INSTRUCTING SECTION |
| B | DEPRESS UP INSTRUCTING SECTION |
| C | DEPRESS UP INSTRUCTING SECTION AND RIGHT INSTRUCTING SECTION |
| D | DEPRESS LEFT INSTRUCTING SECTION |
| E | – |
| F | DEPRESS RIGHT INSTRUCTING SECTION |
| G | DEPRESS DOWN INSTRUCTING SECTION AND LEFT INSTRUCTING SECTION |
| H | DEPRESS DOWN INSTRUCTING SECTION |
| I | DEPRESS DOWN INSTRUCTING SECTION AND RIGHT INSTRUCTING SECTION |

GAME DEVICE, CONTROL METHOD FOR GAME DEVICE, PROGRAM, AND INFORMATION STORAGE MEDIUM

TECHNICAL FIELD

The present invention relates to a game device, a control method for a game device, a program, and an information storage medium.

BACKGROUND ART

There is known a sport game in which an operation subject character repeatedly hits a moving object according to a user's predetermined operation. For example, a tennis game, a table tennis game, etc. are known. In such a sport game, when a user performs a predetermined operation, it is determined whether or not a moving object is included in a decision area specified based on, for example, the position of an operation subject character. When the moving object is included in the decision area, the operation subject character hitting the moving object is displayed on a game screen, whereas when the moving object is not included in the decision area, the operation subject character missing the moving object is displayed on the game screen.
Patent Document 1: JP 2003-205171 A

DISCLOSURE OF THE INVENTION

Problems to be Solved by the Invention

When an opposing player hits a ball on a good trajectory in a real tennis match, for example, a player may not be able to approach the ball sufficiently so that the player should hit the ball in a state where the player is located at a position comparatively far from the ball. In such a case, the player may lose their balance and may not be able to regain their balance before hitting the ball returned by the opposing player. Hence, the player should return the ball in an off-balanced state. A conventional tennis game is not satisfactory in the way of causing the user to feel that the player loses their balance by hitting a ball in the state where the player is located at a position comparatively far from the ball. The same is true of a table tennis game or the like.

The present invention has been made in view of the above-mentioned problem, and it is therefore an object of the present invention to provide a game device, a control method for a game device, a program, and an information storage medium, which can allow a user to feel that an operation subject player character loses its balance in a case where the operation subject player character hits a moving object in such a state where the operation subject player character is comparatively far from the moving object in a sport game in which the operation subject character hits the moving object according to a predetermined operation by a user.

Means for Solving the Problems

In order to solve the above-mentioned problem, a game device according to the present invention is a game device that executes a sport game in which an operation subject character hits a moving object according to a predetermined operation by a user, the game device including: determination means for determining whether or not the moving object is positioned in a decision area which is set based on a position of the operation subject character in a case where the predetermined operation is performed; operation-subject-character control means for causing the operation subject character to hit the moving object in a case where it is determined that the moving object is positioned in the decision area; and decision area control means for controlling a size of the decision area after the operation subject character has hit the moving object, based on a position of the moving object at a reference time based on at least one of a time at which the predetermined operation is performed and a time at which the operation subject character hits the moving object.

Further, a control method according to the present invention is a control method for a game device that executes a sport game in which an operation subject character hits a moving object according to a predetermined operation by a user, the control method including: a determination step of determining whether or not the moving object is positioned in a decision area which is set based on a position of the operation subject character in a case where the predetermined operation is performed; an operation-subject-character control step of causing the operation subject character to hit the moving object in a case where it is determined that the moving object is positioned in the decision area, and causing the operation subject character to miss the moving object in a case where it is determined that the moving object is not positioned in the decision area; and a decision area control step of controlling a size of the decision area after the operation subject character has hit the moving object, based on a position of the moving object at a reference time based on at least one of a time at which the predetermined operation is performed and a time at which the operation subject character hits the moving object.

Further, a program according to the present invention causes a computer such as a stationary type game machine (consumer game machine), a portable game machine, an arcade game machine, a mobile phone, a personal digital assistant (PDA), or a personal computer to function as a game device that executes a sport game in which an operation subject character hits a moving object according to a predetermined operation by a user, and further causes the computer to function as: determination means for determining whether or not the moving object is positioned in a decision area which is set based on a position of the operation subject character in a case where the predetermined operation is performed; operation-subject-character control means for causing the operation subject character to hit the moving object in a case where it is determined that the moving object is positioned in the decision area, and causing the operation subject character to miss the moving object in a case where it is determined that the moving object is not positioned in the decision area; and decision area control means for controlling a size of the decision area after the operation subject character has hit the moving object, based on a position of the moving object at a reference time based on at least one of a time at which the predetermined operation is performed and a time at which the operation subject character hits the moving object.

Further, an information storage medium according to the present invention is a computer-readable information storage medium recording the above-mentioned program. A program delivery device according to the present invention includes an information storage medium recording the program, reads the program from the information storage medium and delivers the program. A program delivery method according to the present invention is a program delivery method of reading the program from an information storage medium recording the program, and delivering the program.

The present invention relates to the game device that executes the sport game in which the operation subject character hits the moving object according to the predetermined operation by the user. According to the present invention, it is determined whether or not the moving object is positioned in the decision area which is set based on the position of the operation subject character in a case where the predetermined operation is performed. In a case when it is determined that the moving object is positioned in the decision area, the operation subject character is controlled to hit the moving object. Further, the size of the decision area after the operation subject character has hit the moving object is controlled based on the position of the moving object at the reference time based on at least one of "the time at which the predetermined operation is performed" and "the time at which the operation subject character hits the moving object". The present invention can allow the user to feel that a player loses their balance in a case where the player hits a ball in such a state where the player is located at a position comparatively far from the ball. As a result, in the sport game in which the operation subject character hits the moving object according to the user's predetermined operation, it is possible to allow the user to feel that the operation subject player character loses its balance in a case where the operation subject player character hits the moving object in such a state where the operation subject player character is located at a position comparatively far from the moving object.

According to an aspect of the present invention, the decision area control means may control the size of the decision area after the operation subject character has hit the moving object, based on a distance between the position of the operation subject character and the position of the moving object at the reference time.

In this aspect, the decision area control means may include: means for determining whether or not the distance between the position of the operation subject character and the position of the moving object at the reference time is greater than a first reference distance; means for setting the size of the decision area after the operation subject character has hit the moving object smaller than a current size in a case where the distance between the position of the operation subject character and the position of the moving object at the reference time is greater than the first reference distance; means for determining whether or not the distance between the position of the operation subject character and the position of the moving object at the reference time is smaller than a second reference distance; and means for setting the size of the decision area after the operation subject character has hit the moving object larger than the current size in a case where the distance between the position of the operation subject character and the position of the moving object at the reference time is smaller than the second reference distance.

According to another aspect of the present invention, the decision area control means may include means for determining whether or not the position of the moving object at the reference time is included in a partial area in the decision area, and may control the size of the decision area after the operation subject character has hit the moving object, based on a result of the determination.

In this aspect, the decision area may include: a first area set so as to include the position of the operation subject character; and a second area other than the first area, and the decision area control means may further include: means for determining whether or not the position of the moving object at the reference time is included in the first area or the second area; means for setting the size of the decision area after the operation subject character has hit the moving object smaller than a current size in a case where the position of the moving object at the reference time is included in the second area; and means for setting the size of the decision area after the operation subject character has hit the moving object larger than the current size in a case where the position of the moving object at the reference time is included in the first area.

BRIEF DESCRIPTION OF THE DRAWINGS

FIG. 6 is a diagram for describing an instruction of a direction in which a ball is returned.

FIG. 7 is a diagram for describing the instruction of the direction in which the ball is returned.

BEST MODE FOR CARRYING OUT THE INVENTION

Hereinafter, detailed description is given of an example of an embodiment of the present invention based on the drawings. Herein, description is given of a case where a game device according to the embodiment of the present invention is implemented by a portable game machine. Note that the game device according to the embodiment of the present invention may be implemented by a stationary type game machine (consumer game machine), an arcade game machine, a mobile phone, a personal digital assistant (PDA), or a personal computer.

Figure 1:
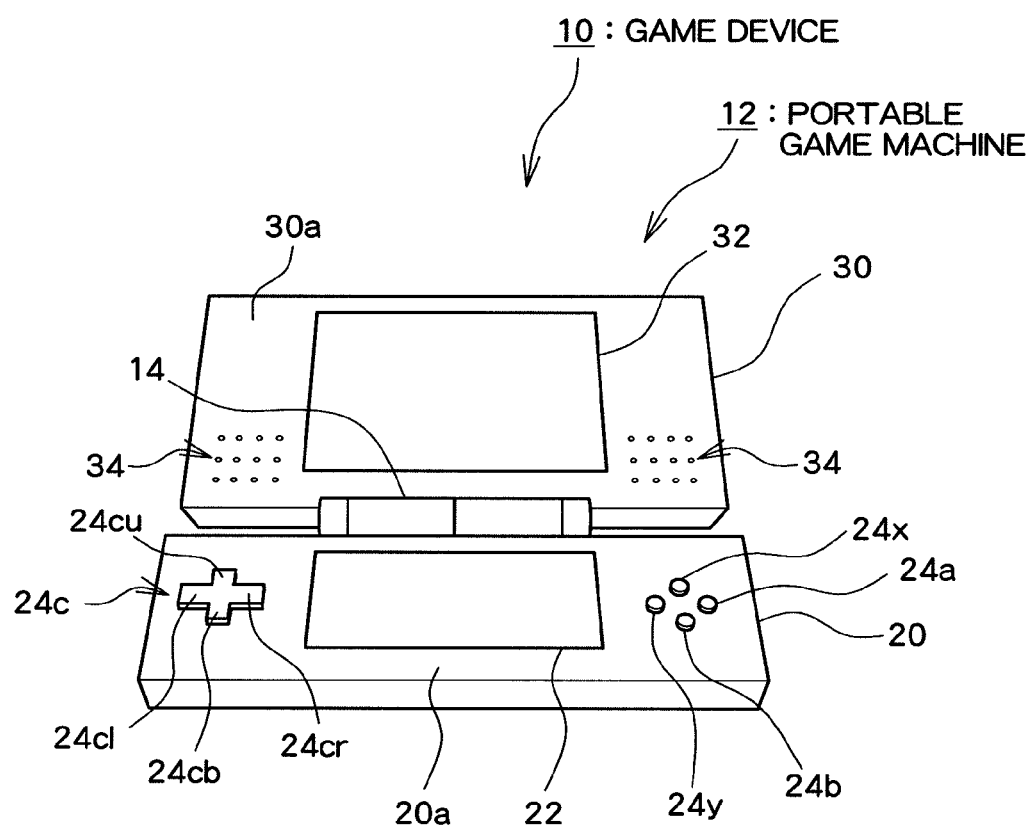
FIG. 1 is a perspective view illustrating an outline of a game device according to an embodiment of the present invention.
Figure 2:
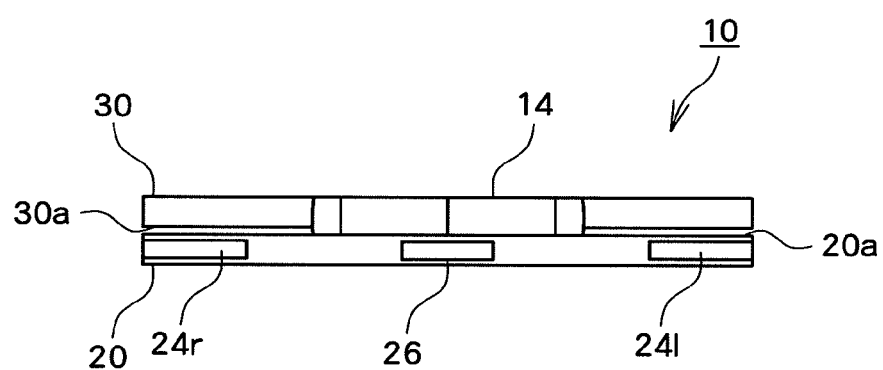
FIG. 2 is a diagram illustrating the outline of the game device according to the embodiment.
Figure 3:
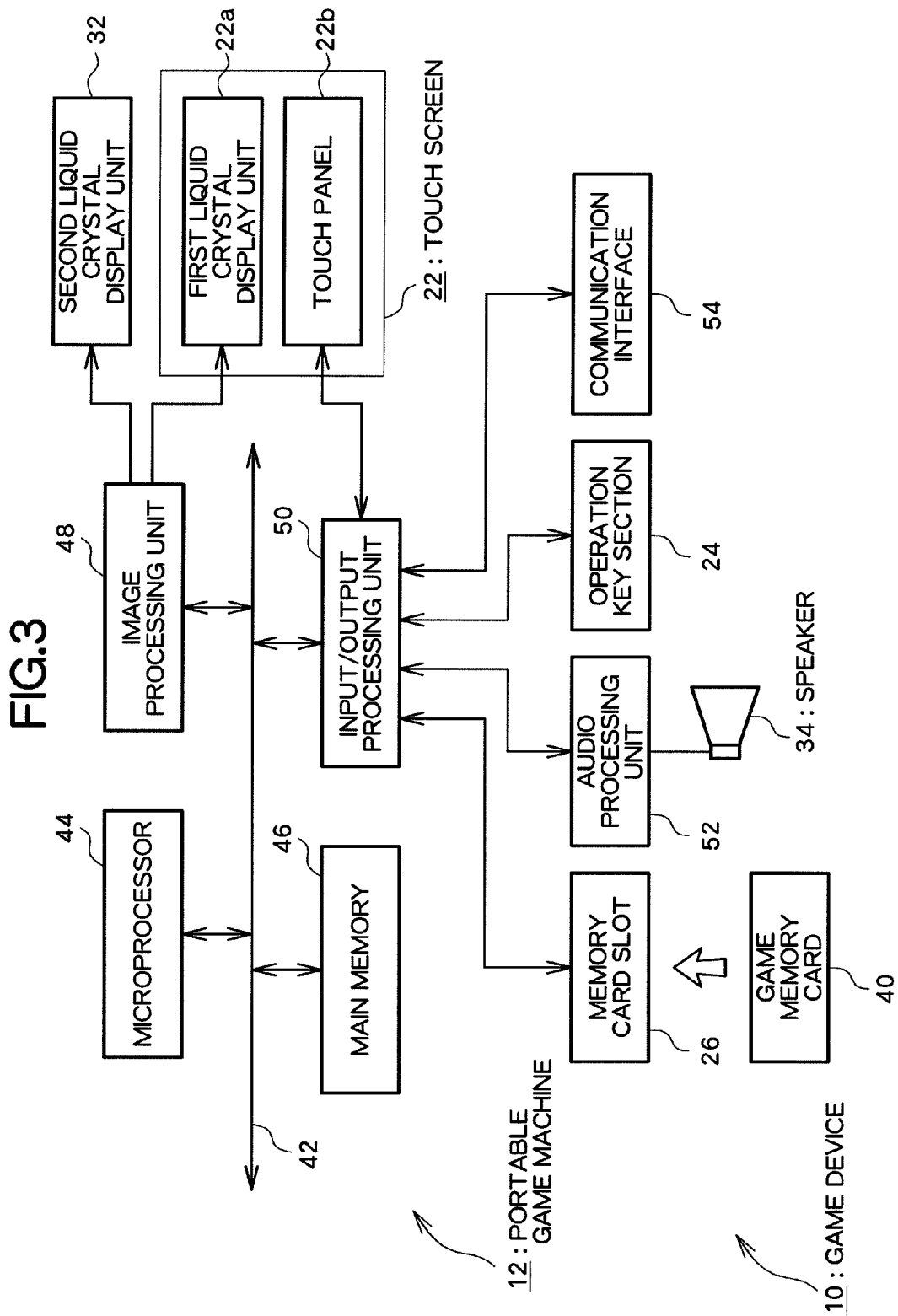
FIG. 3 is a diagram illustrating a hardware configuration of the game device according to the embodiment.

FIGS. 1 and 2 illustrate an outline of a game device 10 according to an embodiment. FIG. 3 illustrates a hardware configuration of the game device 10 according to the embodiment.

FIG. 1 is a perspective view illustrating the game device 10 as viewed from the front. As illustrated in FIG. 1, the game device 10 includes a first casing 20 and a second casing 30. The first casing 20 and the second casing 30 are coupled together by a hinge part 14. A touch screen 22, a cross-shaped button 24c, and buttons 24a, 24b, 24x, 24y are provided on a top surface 20a of the first casing 20. The touch screen 22 includes a first liquid crystal display unit 22a and a touch panel 22b (see FIG. 3). The touch panel 22b is placed over the first liquid crystal display unit 22a. The cross-shaped button 24c includes an UP instructing section 24cu, a DOWN instructing section 24cb, a LEFT instructing section 24cl and a RIGHT instructing section 24cr, and is used for a direction instructing operation, for example. The buttons 24a, 24b, 24x, and 24y are used for various operations. A second liquid crystal display unit 32 is provided on a top surface 30a of the second casing 30. A speaker 34 is built into the second casing 30.

FIG. 2 is a rear view of the game device 10 which is folded (in a state where the top surface 20a of the first casing 20 and the top surface 30a of the second casing 30 are placed one on the other). As illustrated in FIG. 2, buttons 24l and 24r are respectively provided on the rear side of the first casing 20 on the left and right sides. A memory card slot 26 where a game memory card 40 (see FIG. 3) as an information storage medium can be loaded is provided in the center of the rear side of the first casing 20. It is to be noted that other members (not shown), such as a power switch, are mounted to the game device 10.

As illustrated in FIG. 3, the game device 10 includes the touch screen 22 (first liquid crystal display unit 22a and touch panel 22b), an operation key section 24, the memory card slot 26, the second liquid crystal display unit 32, the speaker 34, a bus 42, a microprocessor 44, a main memory 46, an image processing unit 48, an input/output processing unit 50, an audio processing unit 52, and a communication interface 54. Those components are accommodated together with a battery (not shown) in the casings, and are driven by the battery.

The microprocessor 44 controls the individual sections of the game device 10 based on an operating system stored in a ROM (not shown) and a program and data which are stored in the game memory card 40. The main memory 46 includes, for example, a RAM. The program read from the game memory card 40 is written in the main memory 46 as needed. The main memory 46 is also used as a work memory for the microprocessor 44. The bus 42 is used to exchange an address and data among the individual sections of the game device 10. The microprocessor 44, the main memory 46, the image processing unit 48 and the input/output processing unit 50 are connected together by the bus 42 so as to communicate data mutually.

The first liquid crystal display unit 22a and the second liquid crystal display unit 32 are publicly known liquid crystal display panels. The image processing unit 48 includes a VRAM. The image processing unit 48 renders an image in the VRAM according to an instruction from the microprocessor 44. The image rendered in the VRAM is displayed on the first liquid crystal display unit 22a and second liquid crystal display unit 32 at a predetermined time.

The input/output processing unit 50 is an interface via which the microprocessor 44 exchanges data with the touch panel 22b, the operation key section 24, the memory card slot 26, the audio processing unit 52 and the communication interface 54. The input/output processing unit 50 is connected with the touch panel 22b, the operation key section 24, the memory card slot 26, the audio processing unit 52 and the communication interface 54.

The operation key section 24 is input means with which the user makes an operation input. The operation key section 24 includes the cross-shaped button 24c, and the buttons 24a, 24b, 24x, 24y, 24l, and 24r. The input/output processing section 50 scans the state of each part of the operation key section 24 every predetermined cycle (e.g., every 1/60$^{th}$ of a second), and supplies an operation signal representing the scanning result to the microprocessor 44 via the bus 42. The microprocessor 44 determines the contents of the operation made by the user, based on the operation signal. The touch panel 22b is also input means by which the user makes an operation input. The touch panel 22b supplies pressed-position information corresponding to the position pressed by the user to the microprocessor 44 via the input/output processing section 50. The microprocessor 44 determines the position on the touch panel 22b pressed by the user, based on the pressed-position information.

The memory card slot 26 reads a game program and game data stored in the game memory card 40 therefrom according to an instruction from the microprocessor 44. The game memory card 40 includes a ROM where the game program and game data are stored, and an EEPROM where the game data, such as saved data, is stored. The game memory card 40 is used to supply the game program and game data to the game device 10, but another information storage medium, such as an optical disk, may be used as well. Alternatively, the game program and game data may be supplied to the game device 10 from a remote location over a communication network, such as the Internet. As another alternative, the game program and game data may be supplied to the game device 10 using various kinds of data communications, such as infrared communication.

The audio processing unit 52 includes a sound buffer. The audio processing unit 52 outputs various kinds of sound data, which is read into the sound buffer from the game memory card 40, from the speaker 34. The communication interface 54 is an interface for connecting the game device 10 to the communication network.

The game device 10 with the foregoing configuration executes a tennis game. The tennis game is realized when the program stored in the game memory card 40 is executed.

Figure 4:
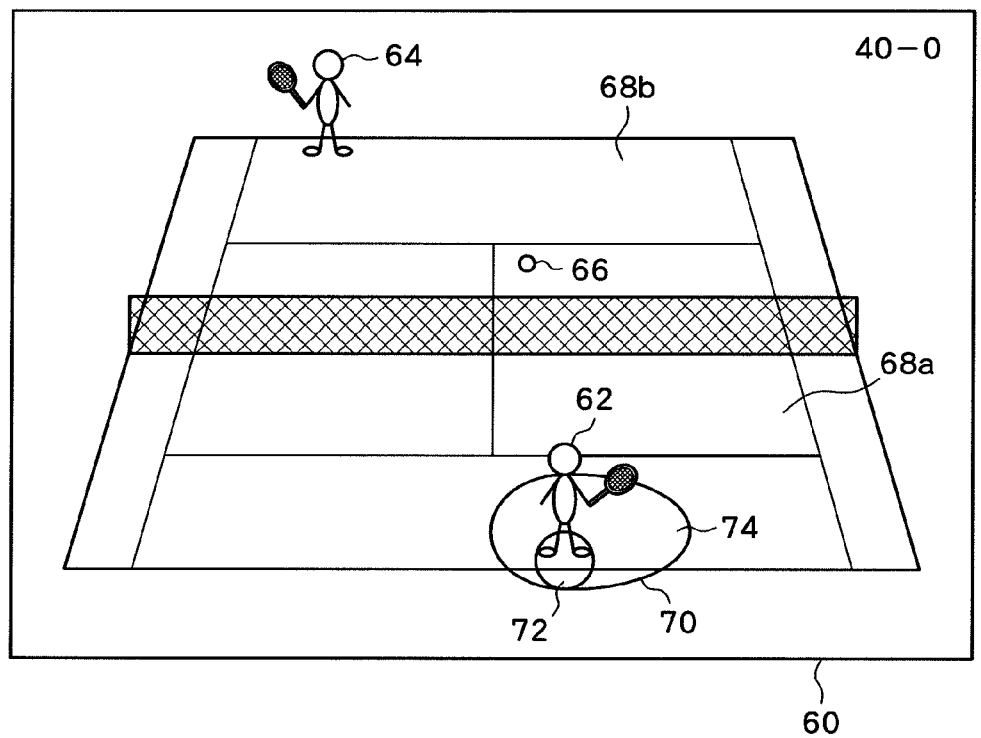
FIG. 4 is a diagram illustrating an example of a game screen.

FIG. 4 illustrates an example of a game screen for the tennis game. As illustrated in FIG. 4, a tennis court is displayed on a game screen 60, and an operation subject character 62, an opponent character 64 and a ball 66 (moving object) are also displayed thereon. The operation subject character 62 is a game character which is operated by the user. The operation subject character 62 moves according to a direction instructing operation by the user, and swings a racket according to a shot instructing action by the user. Meanwhile, the opponent character 64 is a game character which is operated by the microprocessor 44 or an opposing user. The user operates the operation subject character 62 to cause the operation subject character 62 to return the ball 66, which is returned into an own court 68a by the opponent character 64, to an opponent's court 68b.

In this embodiment, particularly, a shot-enabling-area guide image 70 is displayed. The shot-enabling-area guide image 70 is an image for showing a shot enabling area for the operation subject character 62. The shot enabling area is the range of the position of the ball 66 which can be shot by the operation subject character 62. As described later, the shot enabling area is set based on the position of the operation subject character 62. Therefore, the display position of the shot-enabling-area guide image 70 is decided based on the position of the operation subject character 62. The shot-enabling-area guide image 70 includes a first area portion 72 for showing a first area in the shot enabling area and a second area portion 74 for showing a second area in the shot enabling area.

Figure 5:
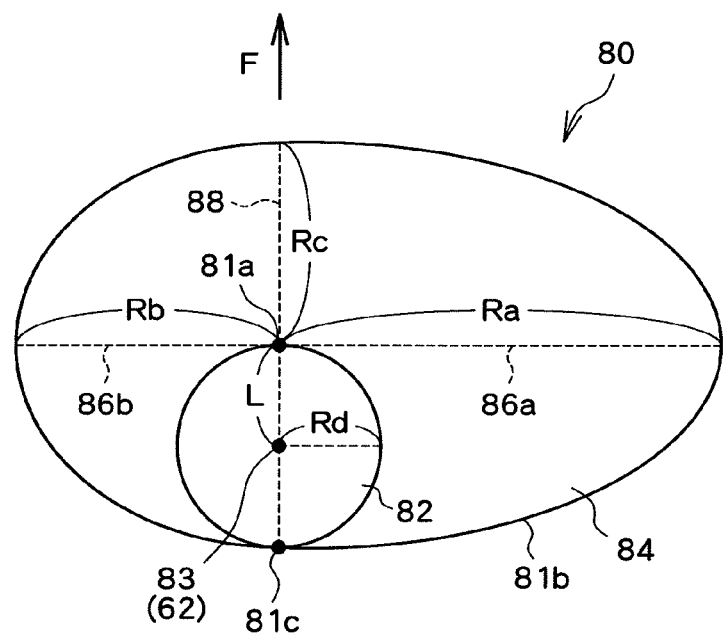
FIG. 5 is a diagram illustrating an example of a shot enabling area.

The shot enabling area is elaborated on below. FIG. 5 illustrates an example of the shot enabling area. Referring to FIG. 5, a direction F indicates the forward direction (frontward direction) of the operation subject character 62. Here, the description is given of a case where the operation subject character 62, the opponent character 64 and the ball 66 are placed in a two-dimensional game space. That is, the description is given of the case where the positions or the like of the operation subject character 62, the opponent character 64 and the ball 66 are managed in the screen coordinate system (two coordinate elements).

As illustrated in FIG. 5, a shot enabling area 80 is an area whose shape is obtained by setting the length of a right-hand side semimajor axis (hereinafter referred to as "first semimajor axis") 86a of a laterally elongated ellipse to Ra, the length of a left-hand side semimajor axis (hereinafter referred to as "second semimajor axis") 86b of the laterally elongated ellipse to Rb, and the length of a semiminor axis 88 of the laterally elongated ellipse to Rc, and deforming the shape. In other words, the shot enabling area 80 is an area obtained by coupling a right-hand half portion of a laterally elongated ellipse whose semimajor axis has the length Ra and whose semiminor axis has the length Rc, and a left-hand half portion of the laterally elongated ellipse whose semimajor axis has the length Rb and whose semiminor axis has the length Rc.

The shot enabling area 80 includes a first area 82 and a second area 84. The first area 82 is a circular area whose radius has a predetermined length (Rd), and the second area 84 is the remaining area of the shot enabling area 80 excluding the first area 82. A center point 83 of the first area 82 is set to the position (foot position) of the operation subject character 62. The shot enabling area 80 is set in such a way that a reference point 81a of the shot enabling area 80 is a position set apart forward (in the direction F) from the center point 83 of the first area 82 by a predetermined distance (L). The distance L between the reference point 81a of the shot enabling area 80 and the center point 83 of the first area 82 is adjusted in such a way that the shot enabling area 80 and the first area 82 contact each other at an intersection 81c between the short axis of the shot enabling area 80 and a boundary line 81b of the shot enabling area 80 (intersection on the rearward side of the operation subject character 62). The reference point 81a of the shot enabling area 80 is equivalent to the center point of the ellipse before the deformation. It is to be noted that the shot enabling area 80 and the first area 82 may not contact each other at the intersection 81c. That is, the second area 84 may be located rearward of the first area 82. For example, the reference point 81a of the shot enabling area 80 may coincide with the center point 83 of the first area 82.

As described above, the shot enabling area 80 is set so that the center point 83 of the first area 82 coincides with the position (foot position) of the operation subject character 62. Therefore, the shot enabling area 80 moves in response to the movement of the operation subject character 62. The first area 82 can be said to be such an area where the distance from the position of the operation subject character 62 is equal to or shorter than a predetermined distance (Rd). The second area 84 can be said to be such an area that lies within the shot enabling area 80 and where the distance from the position of the operation subject character 62 is greater than the predetermined distance (Rd).

The lengths (Ra, Rb, and Rc) of the first semimajor axis 86a, second semimajor axis 86b and semiminor axis 88 of the shot enabling area 80 are decided based on the value of an ability parameter of the operation subject character 62. Suppose that the dominant hand of the operation subject character 62 is the right hand. In this case, the length (Ra) of the first semimajor axis 86a on the right-hand side of the operation subject character 62 is decided based on the value of a forehand parameter of the operation subject character 62. The forehand parameter indicates the level of the forehand ability (ability to hit the ball 66 with the forehand). As the forehand ability of the operation subject character 62 becomes higher, the length (Ra) of the first semimajor axis 86a is set longer. The length (Rb) of the second semimajor axis 86b on the left-hand side of the operation subject character 62 is decided based on the value of a backhand parameter of the operation subject character 62. The backhand parameter indicates the level of the backhand ability (ability to hit the ball 66 with the backhand). As the backhand ability of the operation subject character 62 becomes higher, the length (Rb) of the second semimajor axis 86b is set longer. The length (Rc) of the semiminor axis 88 is decided based on, for example, the lengths (Ra and Rb) of the first semimajor axis 86a and the second semimajor axis 86b. For example, the length (Rc) of the semiminor axis 88 is set to a length obtained by multiplying a length of a shorter one of the first semimajor axis 86a and the second semimajor axis 86b by a predetermined ratio (e.g., 80%). The length (Rc) of the semiminor axis 88 may be decided based on the value of an ability parameter other than the forehand parameter and the backhand parameter of the operation subject character 62.

To cause the operation subject character 62 to shoot the ball 66, the user needs to depress a shot instructing button (e.g., button 24a) at an expected time at which the ball 66 is to be included in the shot enabling area 80. If the user depresses the shot instructing button at a time at which the ball 66 is not included in the shot enabling area 80, the operation subject character 62 misses the ball 66. If the user depresses the shot instructing button at a time at which the ball 66 is included in the shot enabling area 80, on the other hand, the operation subject character 62 takes a shot action to return the ball 66 with the racket.

Using the cross-shaped button 24c, the user can instruct an area to which the ball 66 is to be returned. FIGS. 6 and 7 are diagrams for describing an instruction of the area to which the ball 66 is returned. FIG. 6 is a diagram illustrating a plurality of target areas A to I which are set in the opponent's court 68b. FIG. 7 is a diagram illustrating an example of data which associates the target areas A to I with the contents of operations for the cross-shaped button 24c which should be performed by the user to instruct the target areas. If the operation subject character 62 is instructed to return the ball 66 into the target area A, for example, the user depresses the shot instructing button while depressing the UP instructing section 24cu and the LEFT instructing section 24cl of the cross-shaped button 24c. If the operation subject character 62 is instructed to return the ball 66 into the target area E, for example, the user depresses the shot instructing button with the cross-shaped button 24c undepressed.

Whether the ball 66 moves toward inside the target area indicated by the user is decided based on in which one of the first area 82 and the second area 84 the ball 66 is included at the time at which the user depresses the shot instructing button. If the user depresses the shot instructing button at the time at which the ball 66 is included in the first area 82, the ball 66 is reliably returned into the target area indicated by the user. If the user depresses the shot instructing button at the time at which the ball 66 is included in the second area 84, on the other hand, the accuracy of the shot drops so that the ball 66 may not be returned into the target area indicated by the user. If the user depresses the shot instructing button at the time at which the ball 66 is positioned on the boundary line 81b of the shot enabling area 80, the operation subject character 62 returns the ball 66 while leaping toward the ball 66. In this case, the action of the operation subject character 62 is disabled for a given period.

As described above, to cause the operation subject character 62 to return the ball 66, the user needs to depress the shot instructing button at the time at which the ball 66 is included in the shot enabling area 80. To cause the operation subject character 62 to reliably return the ball 66 into the target area indicated by the user, the user needs to depress the shot instructing button at the time at which the ball 66 is included in the first area 82. According to this embodiment, according to the shot-enabling-area guide image (first area portion 72 and second area portion 74), the user can grasp whether it is the time at which the ball 66 is included in the shot enabling area 80 (first area 82 and second area 84). If the positions or the like of the operation subject character 62 and the ball 66 are managed in the screen coordinate system (two coordinate elements) as in this embodiment, the shot enabling area 80 matches with the display area of the shot-enabling-area guide image 70. Further, the first area 82 matches with the display area of the first area portion 72 of the shot-enabling-area guide image 70, and the second area 84 matches with the display area of the second area portion 74 of the shot-enabling-area guide image 70.

According to this embodiment, particularly, the size of the shot enabling area 80 (second area 84) changes. That is, every time the user depresses the shot instructing button at the time at which the ball 66 is included in the second area 84, the size of the shot enabling area 80 (second area 84) becomes smaller. More specifically, every time the user depresses the shot instructing button at the time at which the ball 66 is included in the second area 84, the lengths (Ra, Rb, and Rc) of the first semimajor axis 86a, second semimajor axis 86b and semiminor axis 88 of the shot enabling area 80 become shorter. With the size of the shot enabling area 80 (second area 84) being smaller than the initial state, if the user depresses the shot instructing button at the time at which the ball 66 is included in the second area 84, the lengths (Ra, Rb, and Rc) of the first semimajor axis 86a, second semimajor axis 86b and semiminor axis 88 of the shot enabling area 80 are set back to the initial values. It is to be noted that the length (Rd) of the radius of the first area 82 does not change.

When the opposing player hits a ball over a good trajectory in a real tennis match, the player may not be able to approach the ball sufficiently and should hit the ball in the state where the player is located at a position comparatively far from the ball. In such a case, the player loses their balance, cannot regain their balance before hitting the ball which is returned next by the opposing player, and should return the ball in an off-balanced state. If the player attempts to return a ball in an off-balanced state, the area where the ball can be returned (area reachable by the racket) generally becomes narrower. With regard to this point, according to the game device 10, if the user depresses the shot instructing button at the time at which the ball 66 is included in the second area 84 (i.e., if the operation subject character 62 returns the ball 66 located in the second area 84), the shot enabling area 80 (second area 84) of the operation subject character 62 becomes narrower. As a result, the user can feel that the operation subject character 62 has lost its balance.

When the player loses their balance in a real tennis match, the player should return the ball returned by the opposing player in an off-balanced state and may further lose their balance. With regard to this point, according to the game device 10, every time the user depresses the shot instructing button at the time at which the ball 66 is included in the second area 84 (i.e., every time the operation subject character 62 returns the ball 66 located in the second area 84), the shot enabling area 80 (second area 84) of the operation subject character 62 becomes gradually narrower. As a result, the user can feel that their balance of the operation subject character 62 is gradually becoming worse.

Even when the player loses their balance in a real tennis match, the player may regain their balance and make a good shot. With regard to this point, according to the game device 10, when the user depresses the shot instructing button at the time at which the ball 66 is included in the first area 82 (i.e., when the operation subject character 62 returns the ball 66 located in the first area 82) with the shot enabling area 80 (second area 84) of the operation subject character 62 being narrower than the initial state, the shot enabling area 80 (second area 84) of the operation subject character 62 returns to the initial state. As a result, the user can feel that the operation subject character 62 without their balance has regained their balance.

Figure 8:
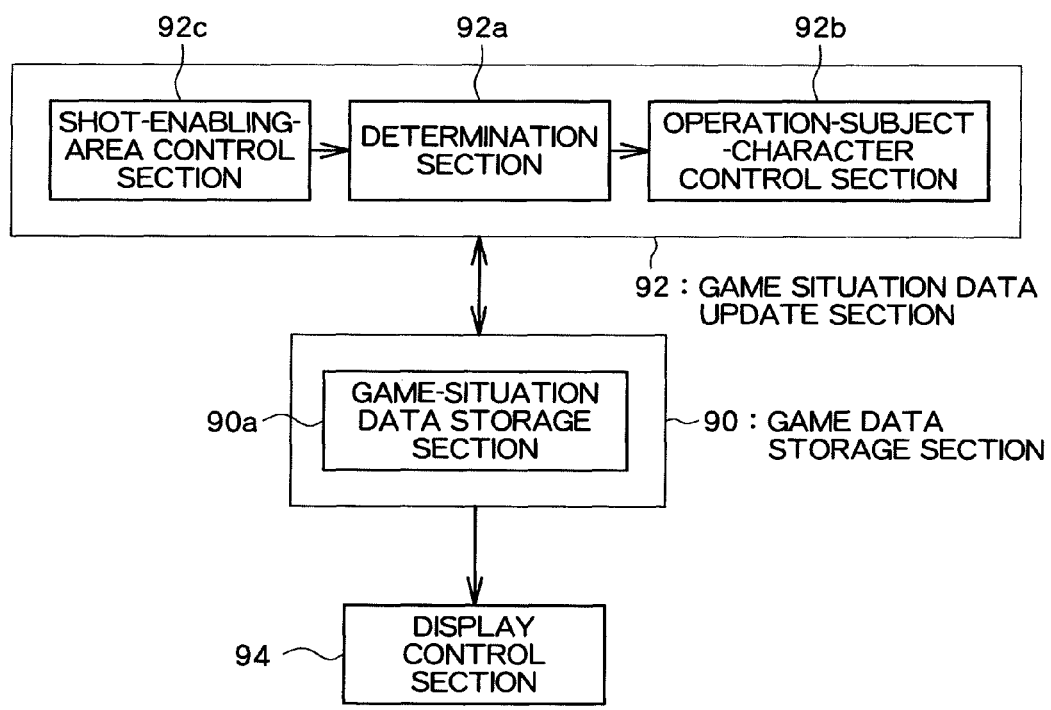
FIG. 8 is a functional block diagram of the game device according to the embodiment.

FIG. 8 is a functional block diagram illustrating functions which are relevant to the present invention among the functions realized by the game device 10. As illustrated in FIG. 8, the game device 10 functionally includes a game data storage section 90, a game situation data update section 92, and a display control section 94. These functional blocks are realized when the game device 10 executes the program.

The game data storage section 90 is realized by, for example, the game memory card 40 and the main memory 46. The game data storage section 90 stores various kinds of data on a tennis game. For example, the game data storage section 90 stores ability parameters indicating the levels of various abilities of the operation subject character 62 and the opponent character 64. For example, the forehand parameter and the backhand parameter are stored.

The game data storage section 90 includes a game-situation data storage section 90a. The game-situation data storage section 90a stores game situation data indicating the current situation of the tennis game. For example, the game situation data includes data indicating the current scoring situation. The game situation data also includes data indicating the current states (position, posture, action content, etc.) of the operation subject character 62 and the opponent character 64. The game situation data further includes data indicating the current state (position, moving speed/direction, etc.) of the ball 66.

In addition, the game situation data includes data indicating the current state of the shot enabling area 80. For example, the game situation data storage section 90a stores the position of the reference point 81a, the initial value (value when the tennis game is started) of the length (Ra) of the first semimajor axis 86a, the initial value of the length (Rb) of the second semimajor axis 86b, the initial value of the length (Rc) of the semiminor axis 88 of the shot enabling area 80, the position of the center point 83 of the first area 82, etc., and a current reduction coefficient (k) of the shot enabling area 80. The reduction coefficient (k) is a numerical value indicating how much the length (Ra) of the first semimajor axis 86a, the length (Rb) of the second semimajor axis 86b or the length (Rc) of the semiminor axis 88 is to be reduced from the initial value. The reduction coefficient (k) takes a value from 0 to 1.

The initial value of the length (Ra) of the first semimajor axis 86a is decided as follows. For example, data which associates the value of the forehand parameter or the backhand parameter with the initial value of the length (Ra) of the first semimajor axis 86a is stored in the game data storage section 90 (game memory card 40). This data is set in such a way that as the value of the forehand parameter or the backhand parameter becomes greater (as the forehand ability or the backhand ability of the operation subject character 62 becomes higher), the initial value of the length (Ra) of the first semimajor axis 86a becomes greater. The data may be of an equation form or a table form. If the operation subject character 62 is right-handed, for example, the initial value of the length (Ra) of the first semimajor axis 86a is computed based on the data and the value of the forehand parameter of the operation subject character 62. If the operation subject character 62 is left-handed, for example, the initial value of the length (Ra) of the first semimajor axis 86a is computed based on the data and the value of the backhand parameter of the operation subject character 62. The initial value of the length (Rb) of the second semimajor axis 86b is decided in the same way as is done for the first semimajor axis 86a. The initial value of the length (Rc) of the semiminor axis 88 is decided as follows. For example, the initial value of the length (Rc) of the semiminor axis 88 is computed by multiplying a shorter one of the length (Ra) of the first semimajor axis 86a and the length (Rb) of the second semimajor axis 86b by a predetermined coefficient (e.g., 0.8). The length (Rd) of the radius of the first area 82 is a fixed value, and is stored in the game data storage section 90 (game memory card 40). The initial value of the reduction coefficient (k) is 1.

The game situation data update section 92 is realized mainly by the microprocessor 44. The game situation data update section 92 updates game situation data. The game situation data update section 92 updates state data of the operation subject character 62 based on the contents of the user's operation. For example, the position data of the operation subject character 62 is updated based on the contents of the direction instructing operation by the user.

The game situation data update section 92 also updates state data of the opponent character 64 according to a predetermined algorithm. In addition, the game situation data update section 92 updates state data of the ball 66. Further, the game situation data update section 92 updates scoring situation data.

The game situation data update section 92 includes a determination section 92a, an operation-subject-character control section 92b, and a shot-enabling-area control section 92c (decision area control means).

When the user performs a shot instructing operation (depression of the shot instructing button), the determination section 92a determines whether or not the ball 66 is positioned in the shot enabling area 80 (decision area) set based on the position of the operation subject character 62.

When the user performs a shot instructing operation (depression of the shot instructing button), the operation-subject-character control section 92b causes the operation subject character 62 to take an action based on the result of the determination made by the determination section 92a. If it is determined that the ball is positioned in the shot enabling area 80, the operation-subject-character control section 92b causes the operation subject character 62 to return the ball 66. If it is determined that the ball 66 is not positioned in the shot enabling area 80, on the other hand, the operation-subject-character control section 92b causes the operation subject character 62 to miss the ball 66.

The shot-enabling-area control section 92c controls the size of the shot enabling area 80 of the operation subject character 62 after the operation subject character 62 has hit the ball 66 based on the position of the ball 66 at a reference time based on at least one of the time at which the shot instructing operation is performed and the time at which the operation subject character 62 hits the ball 66.

Here, the reference time is the time at which, for example, a shot instructing operation is carried out. Alternatively, the reference time may be the time, for example, immediately before execution of a shot instructing operation. The reference time may be the time at which, for example, the operation subject character 62 hits the ball 66. The reference time may be the time, for example, from the point at which a shot instructing operation is carried out to the point at which the operation subject character 62 hits the ball 66.

For example, the shot-enabling-area control section 92c controls the size of the shot enabling area 80 after the operation subject character 62 has hit the ball 66 based on the distance between the position of the operation subject character 62 and the position of the ball 66 at the reference time.

More specifically, the shot-enabling-area control section 92c determines whether or not the distance between the position of the operation subject character 62 and the position of the ball 66 at the reference time is greater than a first reference distance. If it is determined that the distance between the position of the operation subject character 62 and the position of the ball 66 at the reference time is greater than the first reference distance, the shot-enabling-area control section 92c sets the size of the shot enabling area 80 after the operation subject character 62 has hit the ball 66 smaller than the current size. The shot-enabling-area control section 92c also determines whether or not the distance between the position of the operation subject character 62 and the position of the ball 66 at the reference time is equal to or less than a second reference distance. If it is determined that the distance between the position of the operation subject character 62 and the position of the ball 66 at the reference time is equal to or less than the second reference distance with the size of the shot enabling area 80 being smaller than the original size thereof, the shot-enabling-area control section 92c increases the size of the shot enabling area 80 after the operation subject character 62 has hit the ball 66 to the original size. In this embodiment, the first reference distance and the second reference distance are set to the same distance (Rd). That is, if the distance between the position of the operation subject character 62 and the position of the ball 66 at the reference time is greater than Rd, the size of the shot enabling area 80 after the operation subject character 62 has hit the ball 66 becomes smaller than the current size. If the distance between the position of the operation subject character 62 and the position of the ball 66 at the reference time is equal to or less than Rd with the size of the shot enabling area 80 being smaller than the original size thereof, the size of the shot enabling area 80 after the operation subject character 62 has hit the ball 66 is increased to the original size. The first reference distance and the second reference distance may be set different from each other, in which case the first reference distance is set greater than the second reference distance.

In addition, for example, the shot-enabling-area control section 92c determines whether or not the position of the ball 66 at the reference time is included in a partial area in the shot enabling area 80. Then, based on the determination result, the shot-enabling-area control section 92c controls the size of the shot enabling area 80 after the operation subject character 62 has hit the ball 66.

The shot-enabling-area control section 92c according to this embodiment determines whether or not the position of the ball 66 at the reference time is included in the first area 82 (first partial area) or the second area 84 (second partial area). If it is determined that the position of the ball 66 at the reference time is included in the second area 84, the size of the shot enabling area 80 after the operation subject character 62 has hit the ball 66 is set smaller than the current size. If it is determined that the position of the ball 66 at the reference time is included in the first area 82 with the size of the shot enabling area 80 being smaller than the original size thereof, the shot-enabling-area control section 92c increases the size of the shot enabling area 80 after the operation subject character 62 has hit the ball 66 to the original size.

The display control section 94 is realized mainly by the microprocessor 44 and the image processing section 48. The display control section 94 displays the game screen 60 on the first liquid crystal display unit 22a or the second liquid crystal display unit 32 based on the stored contents in the game data storage section 90.

Figure 9:
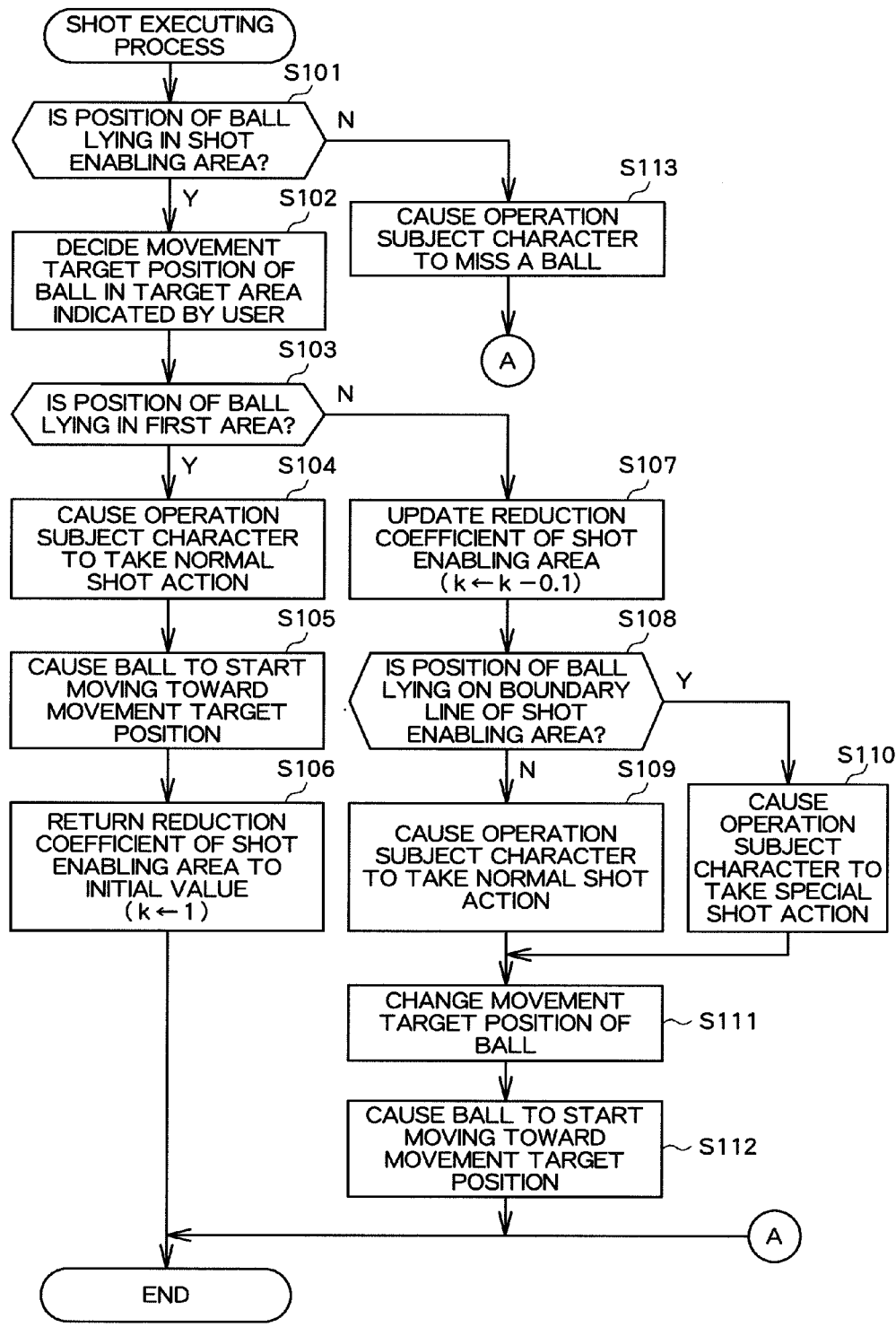
FIG. 9 is a flowchart illustrating a process to be executed by the game device.

Next, a process that is executed by the game device 10 is described. FIG. 9 is a flowchart illustrating the process that is executed by the game device 10 in a case where a shot instructing operation is carried out. The microprocessor 44 executes the process illustrated in FIG. 9 according to the program stored in the game memory card 40.

As illustrated in FIG. 9, the microprocessor 44 (determination section 92a) first determines whether or not the position of the ball 66 lies in the shot enabling area 80 of the operation subject character 62 (S101). At this time, the shot enabling area 80 is specified based on the current position of the operation subject character 62. The length (Ra) of the first semimajor axis 86a is set to ROa*k based on the initial value (ROa) of the length of the first semimajor axis 86a and the current value of the reduction coefficient (k). "*" is a multiplication operator. Likewise, the length (Rb) of the second semimajor axis 86b is set to ROb*k based on the initial value (ROb) of the length of the second semimajor axis 86b and the current value of the reduction coefficient (k). Further, the length (Rc) of the semiminor axis 88 is set to ROc*k based on the initial value (ROc) of the length (Rc) of the semiminor axis 88 and the current value of the reduction coefficient (k). The distance (L) between the reference point 81a of the shot enabling area 80 and the center point 83 of the first area 82 is set to Rc-Rd. It is to be noted that if the value of ROa*k is smaller than the length (Rd) of the radius of the first area 82, the length (Ra) of the first semimajor axis 86a is set to the same length (Rd) as the radius of the first area 82. The same is true of the length (Rb) of the second semimajor axis 86b and the length (Rc) of the semiminor axis 88. Such setting is performed to prevent the size of the shot enabling area 80 from becoming smaller than the size of the first area 82.

In this step (S101), if a representative point (e.g., center point) of the ball 66 is included in the shot enabling area, it is determined that the position of the ball 66 lies in the shot enabling area 80. If at least a part of the ball 66 is included in the shot enabling area 80, it may be determined that the position of the ball 66 lies in the shot enabling area 80. Only if the entire ball 66 is included in the shot enabling area 80, may it be determined that the position of the ball 66 lies in the shot enabling area 80.

If the position of the ball 66 does not lie in the shot enabling area 80 of the operation subject character 62, the microprocessor 44 (operation-subject-character control section 92b) updates the state data of the operation subject character 62 and the ball 66 in such a way that the operation subject character 62 misses the ball 66 (S113).

If the position of the ball 66 lies in the shot enabling area 80 of the operation subject character 62, on the other hand, the microprocessor 44 decides the movement target position of the ball 66 in a target area indicated by the user (S102). In this step, the operational state of the cross-shaped button 24c is determined first. Then, the target area indicated by the user is determined based on the operational state of the cross-shaped button 24c and data illustrated in FIG. 7. If the UP instructing section 24cu and the RIGHT instructing section 24cr of the cross-shaped button 24c are depressed, for example, it is determined that the user has indicated the target area C. Thereafter, the movement target position of the ball 66 in the target area indicated by the user is decided.

Thereafter, the microprocessor 44 determines whether or not the position of the ball 66 lies in the first area 82 (S103). If the position of the ball 66 lies in the first area 82, the microprocessor 44 (operation-subject-character control section 92b) updates the state data of the operation subject character 62 in such a way that the operation subject character 62 makes a normal shot action (S104). The "normal shot action" is the action of the operation subject character 62 to return the ball 66 in a standing state. The microprocessor 44 (game situation data update section 92) also updates the state data of the ball 66 in such a way that the ball 66 starts moving toward the movement target position (S105). Further, the microprocessor 44 (shot-enabling-area control section 92c) sets the reduction coefficient (k) of the shot enabling area 80 of the operation subject character 62 back to the initial value (1) (S106). In a case where the process of this step is executed, the size of the shot enabling area 80 of the operation subject character 62 returns to the initial value.

If the position of the ball 66 does not lie in the first area (i.e., if the position of the ball 66 lies within the second area 84), on the other hand, the microprocessor 44 (shot-enabling-area control section 92c) decrements the value of the reduction coefficient (k) of the shot enabling area 80 of the operation subject character 62 by 0.1 (S107). In a case where the process of this step is executed, the size of the shot enabling area 80 of the operation subject character 62 becomes smaller than the current size. It is to be noted that when the current value of the reduction coefficient (k) is 0.1, the process of this step is not executed, in order to prevent the value of the reduction coefficient (k) from becoming 0. In this step, the value of the reduction coefficient (k) may be updated to a value obtained by multiplying the current value by a predetermined coefficient (predetermined value greater than 0 and less than 1: e.g., 0.9).

Thereafter, the microprocessor 44 determines whether or not the position of the ball 66 lies on the boundary line 81b of the shot enabling area 80 of the operation subject character 62 (S108). In this step, it is determined that the position of the ball 66 lies on the boundary line 81b of the shot enabling area 80 when at least a part of the ball 66 lies on the boundary line 81b of the shot enabling area 80. It may be determined that the position of the ball 66 lies on the boundary line 81b of the shot enabling area 80 when a representative point (e.g., center point) of the ball 66 lies on the boundary line 81b of the shot enabling area 80. The boundary line 81b may be an area having a predetermined width.

If the position of the ball 66 does not lie on the boundary line 81b of the shot enabling area 80, the microprocessor 44 (operation-subject-character control section 92b) updates the state data of the operation subject character 62 in such a way that the operation subject character 62 performs a normal shot action (S109).

As in Step S104, the "normal shot action" is the action of the operation subject character 62 to return the ball 66 in a standing state. If the position of the ball 66 lies on the boundary line 81b of the shot enabling area 80, on the other hand, the microprocessor 44 (operation-subject-character control section 92b) updates the state data of the operation subject character 62 in such a way that the operation subject character 62 performs a special shot action (S110). The "special shot action" is the action of the operation subject character 62 to return the ball 66 while leaping toward the ball 66.

After the process of S109 or S110 is executed, the microprocessor 44 changes the movement target position of the ball 66 (S111). For example, the movement target position of the ball 66 is changed from the position decided in S102 to a position shifted in a direction which is decided based on a random number by a distance which is decided based on a random number. In this case, the movement target position of the ball 66 may come off the target area indicated by the user, or may come out of the opponent's court 68b. After the movement target position of the ball 66 is changed, the microprocessor 44 (game situation data update section 92) updates the state data of the ball 66 in such a way that the ball 66 starts moving toward the changed movement target position (S112).

The microprocessor 44 and the image processing section 48 (display control section 94) update the game screen 60 every predetermined time (e.g., $1/60^{th}$ of a second). The states of the operation subject character 62, the opponent character 64 and the ball 66 which are displayed on the game screen 60 are updated based on the state data of the operation subject character 62, the opponent character 64 and the ball 66. The shot-enabling-area guide image 70 which is displayed on the game screen 60 is updated based on the state data of the shot enabling area 80.

The game device 10 described above can allow the user to feel that the operation subject character 62 has lost its balance. In addition, the game device 10 can allow the user to feel that the balance of the operation subject character 62 is gradually becoming worse. It is also possible to allow the user to feel that the operation subject character 62 without its balance has regained its balance.

The present invention is not limited to the foregoing embodiment.

Figure 10:
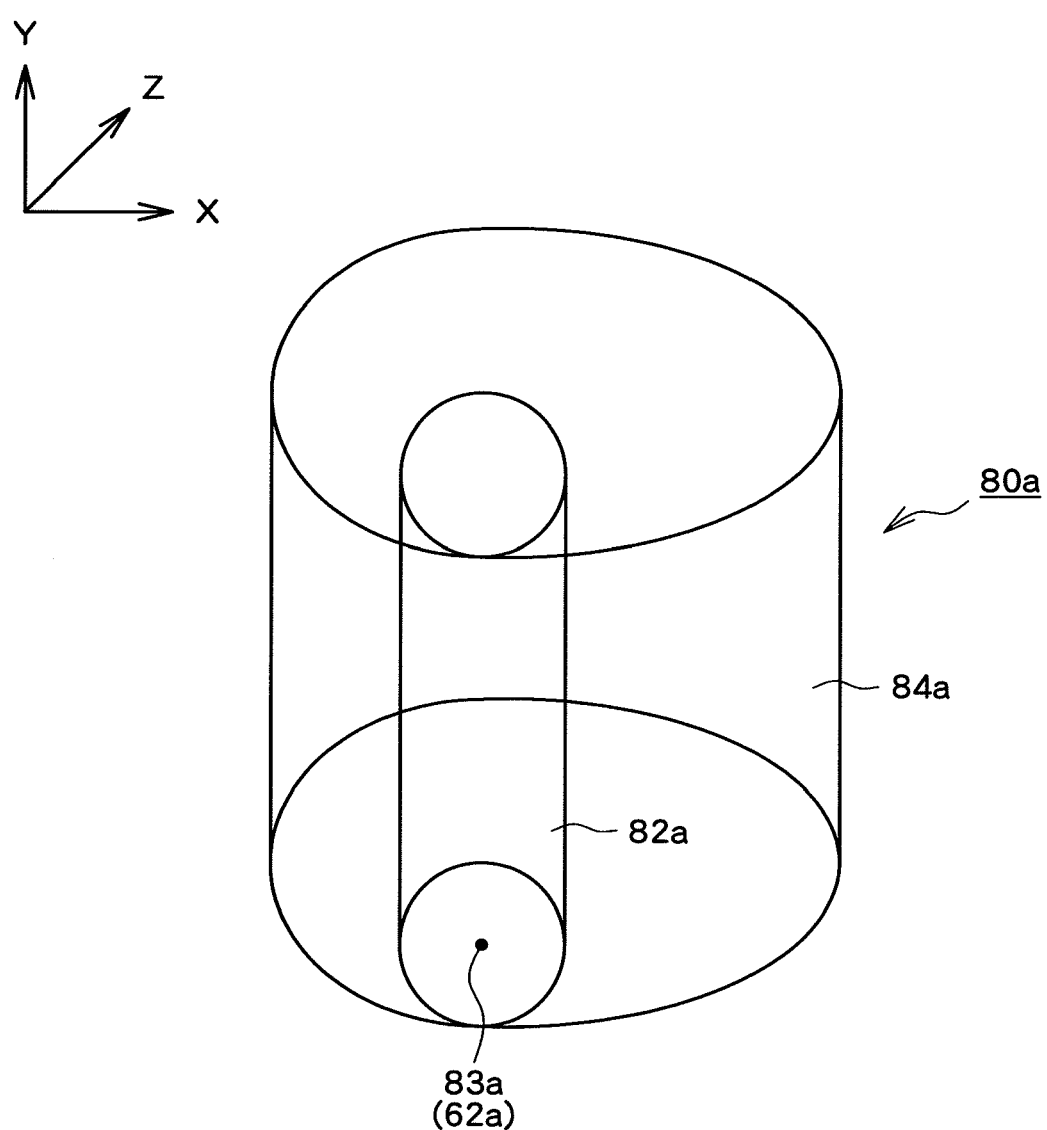
FIG. 10 is a diagram illustrating another example of the shot enabling area.

For example, a virtual three-dimensional space may be created in the main memory 46 to display the game screen 60. An object representing a tennis court, and objects which correspond to the operation subject character 62, the opponent character 64 and the ball 66 are located in the virtual three-dimensional space. An object corresponding to the shot-enabling-area guide image 70 is also located in the virtual three-dimensional space. The game screen 60 represents the virtual three-dimensional space viewed from a virtual camera. In this case, the positions or the like of the operation subject character 62, the opponent character 64 and the ball 66 are managed by three coordinate elements. FIG. 10 is a diagram illustrating an example of the shot enabling area in this case. In the example illustrated in FIG. 10, a shot enabling area 80a is a cylindrical area. The bottom of the shot enabling area 80a has a shape similar to that of the shot enabling area 80 illustrated in FIG. 5. The height (H) of the shot enabling area 80a is decided based on, for example, the height of the operation subject character 62. A first area 82a is also a cylindrical area. The bottom of the first area 82a has a shape similar to that of the first area 82 illustrated in FIG. 5. The area in the shot enabling area 80a other than the first area 82a is a second area 84a. The shot enabling area 80a is set in such a way that a center point 83a in the bottom of the first area 82a becomes a foot position 62a of the operation subject character 62. In this case, an object representing, for example, the bottom area of the shot enabling area 80a is located as the object corresponding to the shot-enabling-area guide image 70. An object representing the bottom area of the first area 82a is also located. As a result, the shot-enabling-area guide image 70 representing the bottom area of the shot enabling area 80a is displayed on the game screen 60. At this time, the first area portion 72 of the shot-enabling-area guide image 70 indicates the bottom area of the first area 82a.

In addition, for example, the coefficient (k) may be a coefficient (enlargement coefficient) indicating how much larger than the original size the shot enabling area 80 becomes, in place of the coefficient (reduction coefficient) indicating how much smaller than the original size the shot enabling area 80 becomes. In this case, the coefficient k takes a value equal to or greater than 1. In S106 of FIG. 9, 0.1, for example, may be added to the value of the coefficient k. In S107 of FIG. 9, the value of the coefficient k may be returned to the initial value (1).

If it is determined in the foregoing manner that the distance between the position of the operation subject character 62 and the position of the ball 66 at the reference time is equal to or less than the second reference distance, the shot-enabling-area control section 92c may set the size of the shot enabling area 80 after the operation subject character 62 has hit the ball 66 larger than the current size. If it is determined that the distance between the position of the operation subject character 62 and the position of the ball 66 at the reference time is greater than the first reference distance with the size of the shot enabling area 80 being larger than the original size, the shot-enabling-area control section 92c may reduce the size of the shot enabling area 80 after the operation subject character 62 has hit the ball 66 to the original size. While the first reference distance and the second reference distance are the same distance (Rd) according to this embodiment, the first reference distance and the second reference distance may differ from each other, in which case the first reference distance is set greater than the second reference distance.

In other words, if it is determined that the position of the ball 66 at the reference time is included in the first area 82, the shot-enabling-area control section 92c may set the size of the shot enabling area 80 after the operation subject character 62 has hit the ball 66 larger than the current size. When it is determined that the position of the ball 66 at the reference time is included in the second area 84 with the size of the shot enabling area 80 being larger than the original size, the shot-enabling-area control section 92c may reduce the size of the shot enabling area 80 after the operation subject character 62 has hit the ball 66 to the original size.

In a case where the user depresses the shot instructing button at a time at which the ball 66 is positioned in the first area 82 as mentioned above, it may be considered that the operation subject character 62 is hitting the ball 66 in a well-balanced state, and the shot enabling area 80 (second area 84) of the operation subject character 62 may be set larger than the initial state. In a case where the user depresses the shot instructing button at a time at which the ball 66 is positioned in the second area 84, it may be considered that the operation subject character 62 loses its balance, and the shot enabling area 80 (second area 84) of the operation subject character 62 may be set back to the initial state. This can also allow the user to feel that the operation subject character 62 has lost its balance. It is also possible to allow the user to feel that the operation subject character 62 without its balance has regained its balance.

In addition, for example, the shot-enabling-area control section 92c may prestore data on a plurality of shot enabling areas 80 of different sizes and shapes. The shot-enabling-area control section 92c may change the size and shape of the shot enabling area 80 based on the data. In a case where the size of the shot enabling area 80 is changed in ten levels, for example, the shot-enabling-area control section 92c may prestore data for specifying the shot enabling area 80 corresponding to each level, and may change the size of the shot enabling area 80 based on the data.

Further, the shot enabling area 80 may include three or more areas, for example. For example, the shot enabling area 80 may include the first area 82, the second area 84 and a third area. For example, the third area is an area whose distance from the center point of the first area 82 is greater than Rd and equal to or smaller than Re (Re>Rd). In this case, the third area is provided between the first area 82 and the second area 84. If the position of the ball 66 at the reference time is included in the third area, the size of the shot enabling area 80 may be set larger than the current size. In this case, it is preferable that the degree of the change in size of the shot enabling area 80 should be made smaller than that in the case where the position of the ball 66 at the reference time is included in the first area 82. That is, if the position of the ball 66 at the reference time is included in the third area, it is preferable that the size of the shot enabling area 80 should be set slightly larger but should not be set back to the original size. Alternatively, if the position of the ball 66 at the reference time is included in the third area, the size of the shot enabling area 80 may be set smaller than the current size. In this case, it is preferable that the degree of the change in size of the shot enabling area 80 should be made smaller than that in the case where the position of the ball 66 at the reference time is included in the second area 84.

In addition, for example, the operation subject character 62 may automatically move according to the operation by the microprocessor 44 instead of according to the user's direction instructing operation. In this case, the user performs the shot instructing operation alone.

For example, the present invention may be applied to sport games other than the tennis game. The present invention may be applied to, for example, a table tennis game, a volleyball game and a baseball game. Further, the present invention may be applied to imaginary sport games imitating real sports such as tennis, table tennis, volleyball and baseball.

Figure 11:
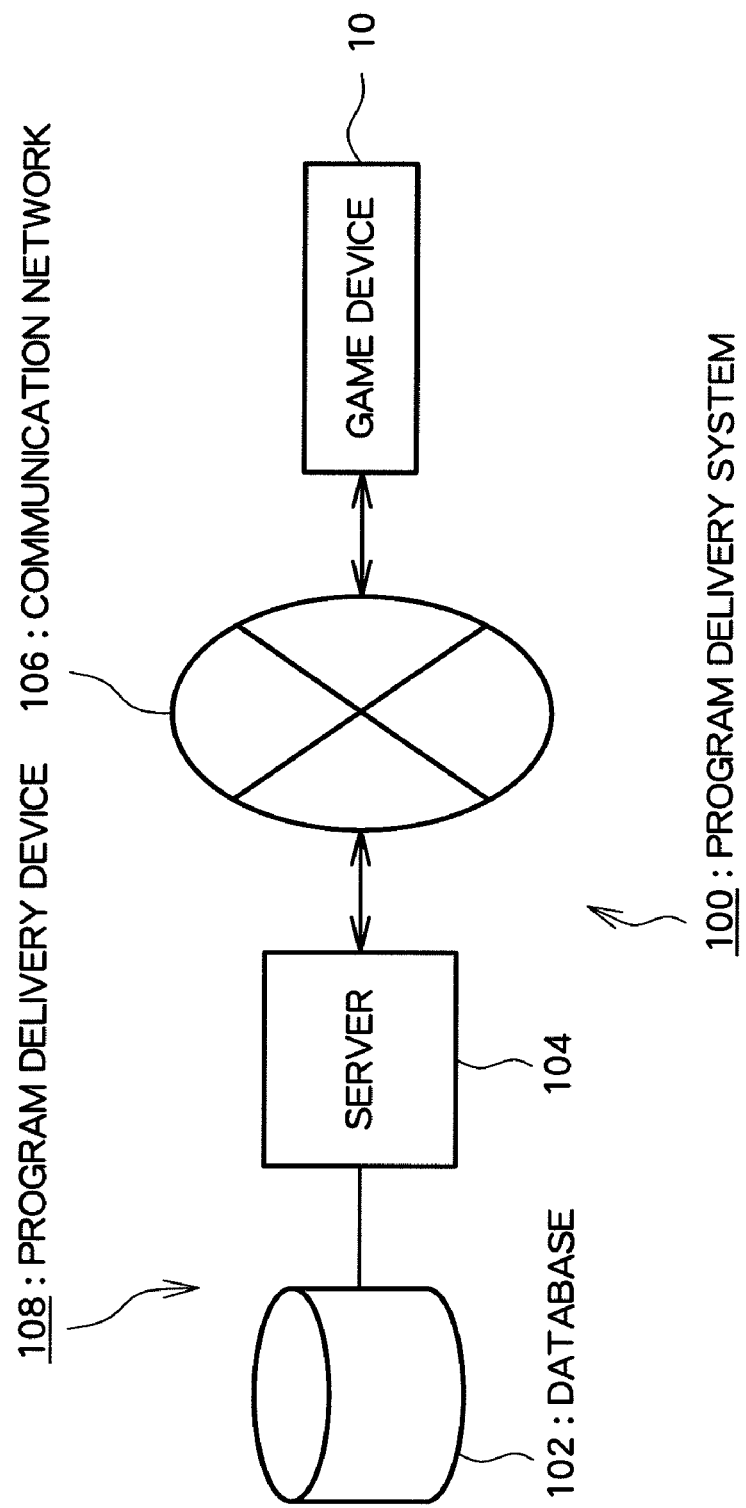
FIG. 11 is a diagram illustrating an overall configuration of a program delivery system according to an embodiment of the present invention.

Further, in the above-mentioned description, the program is supplied via the game memory card 40 serving as an information storage medium to the game device 10, but the program may be delivered to the game device 10 via a communication network. FIG. 11 is a diagram illustrating an overall configuration of a program delivery system using the communication network. Based on FIG. 11, description is given of a program delivery method according to the present invention. As illustrated in FIG. 11, program delivery system 100 includes a program delivery device 108, a communication network 106, and the game device 10. The program delivery device 108 includes a database 102 and a server 104. The communication network 106 includes, for example, the Internet and a cable television network. In this system, the same program as the contents stored in the game memory card 40 is stored in the database (information storage medium) 102. Then, a demander uses the game device 10 to make a program delivery request, whereby the program delivery request is transferred to the server 104 via the communication network 106. Then, the server 104 reads the program from the database 102 according to the program delivery request, and transmits the program to the game device 10. Here, the program is transmitted according to the program delivery request, but the server 104 may transmit the program unilaterally.

By thus delivering the program via the communication network 106, the demander can obtain the program with ease.

The invention claimed is:

1. A game device that executes a sport game in which an operation subject character hits a moving object according to a hit instructing operation by a user, the game device comprising:
    determination means for determining whether or not the moving object is positioned in a decision area which is set based on a position of the operation subject character in a case where the hit instructing operation is performed;
    operation-subject-character control means for causing the operation subject character to hit the moving object in a case where it is determined that the moving object is positioned in the decision area; and
    decision area control means, implemented by one or more processors, for controlling a size of the decision area after the operation subject character has hit the moving object, based on a position of the moving object at a reference time, the reference time being based on at least one of a time at which the hit instructing operation is performed and a time at which the operation subject character hits the moving object,
    wherein the decision area control means controls the size of the decision area after the operation subject character hits the moving object, based on a determination result of a distance between the position of the operation subject character and the position of the moving object at the reference time.

2. A game device according to claim 1, wherein the decision area control means comprises:
    means for determining whether or not the distance between the position of the operation subject character and the position of the moving object at the reference time is greater than a first reference distance;
    means for setting the size of the decision area after the operation subject character has hit the moving object smaller than a current size in a case where the distance between the position of the operation subject character and the position of the moving object at the reference time is greater than the first reference distance;
    means for determining whether or not the distance between the position of the operation subject character and the position of the moving object at the reference time is smaller than a second reference distance; and
    means for setting the size of the decision area after the operation subject character has hit the moving object larger than the current size in a case where the distance between the position of the operation subject character and the position of the moving object at the reference time is smaller than the second reference distance.

3. A game device according to claim 1, wherein the decision area control means comprises means for determining whether or not the position of the moving object at the reference time is included in a partial area in the decision area, and controls the size of the decision area after the operation subject character has hit the moving object, based on a result of the determination.

4. A game device according to claim 3, wherein:
    the decision area comprises:
        a first area set so as to include the position of the operation subject character; and
        a second area other than the first area; and
    the decision area control means further comprises:
        means for determining whether or not the position of the moving object at the reference time is included in the first area or the second area;
        means for setting the size of the decision area after the operation subject character has hit the moving object smaller than a current size in a case where the position of the moving object at the reference time is included in the second area; and
        means for setting the size of the decision area after the operation subject character has hit the moving object larger than the current size in a case where the position of the moving object at the reference time is included in the first area.

5. A control method for a game device that executes a sport game in which an operation subject character hits a moving object according to a hit instructing operation by a user, the control method comprising:
    determining whether or not the moving object is positioned in a decision area which is set based on a position of the operation subject character in a case where the hit instructing operation is performed;
    causing the operation subject character to hit the moving object in a case where it is determined that the moving object is positioned in the decision area, and causing the operation subject character to miss the moving object in a case where it is determined that the moving object is not positioned in the decision area; and controlling, by one or more processors, a size of the decision area after the operation subject character has hit the moving object, based on a position of the moving object at a reference time, the reference time being based on at least one of a time at which the hit instructing operation is performed and a time at which the operation subject character hits the moving object, wherein the size of the decision area after the operation subject character hits the moving object is controlled based on a determination result of a distance between the position of the operation subject character and the position of the moving object at the reference time.

6. A computer-readable information memory having stored thereon a program for causing a computer to function as a game device that executes a sport game in which an operation subject character hits a moving object according to a hit instructing operation by a user, the program further causing the computer to perform a method comprising:

determining whether or not the moving object is positioned in a decision area which is set based on a position of the operation subject character in a case where the hit instructing operation is performed;

causing the operation subject character to hit the moving object in a case where it is determined that the moving object is positioned in the decision area, and causing the operation subject character to miss the moving object in a case where it is determined that the moving object is not positioned in the decision area; and controlling, by one or more processors, a size of the decision area after the operation subject character has hit the moving object, based on a position of the moving object at a reference time, the reference time being based on at least one of a time at which the hit instructing operation is performed and a time at which the operation subject character hits the moving object, wherein the size of the decision area after the operation subject character hits the moving object is controlled based on a determination result of a distance between the position of the operation subject character and the position of the moving object at the reference time.

7. A game device that executes a sport game in which an operation subject character hits a moving object according to a hit instructing operation by a user, the game device comprising:

one or more processors configure to:

determine whether or not the moving object is positioned in a decision area which is set based on a position of the operation subject character in a case where the hit instructing operation is performed;

cause the operation subject character to hit the moving object in a case where it is determined that the moving object is positioned in the decision area; and control a size of the decision area after the operation subject character has hit the moving object, based on a position of the moving object at a reference time, the reference time being based on at least one of a time at which the hit instructing operation is performed and a time at which the operation subject character hits the moving object, wherein the size of the decision area after the operation subject character hits the moving object is controlled based on a determination result of a distance between the position of the operation subject character and the position of the moving object at the reference time.

* * * * *